(12) United States Patent
Chuang et al.

(10) Patent No.: US 9,363,675 B2
(45) Date of Patent: Jun. 7, 2016

(54) DISTRIBUTED WIRELESS SECURITY SYSTEM

(75) Inventors: Che-Ming Chuang, Angora Hills, CA (US); Carl Tung, Irvine, CA (US); Hsiu-Ling Lee, Arcadia, CA (US); Kung-Shiuh Huang, Orange, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 2218 days.

(21) Appl. No.: 11/453,725

(22) Filed: Jun. 15, 2006

(65) Prior Publication Data

US 2007/0291945 A1 Dec. 20, 2007

(51) Int. Cl.
*H04L 29/00* (2006.01)
*H04W 12/12* (2009.01)
*H04L 29/06* (2006.01)

(52) U.S. Cl.
CPC ............. *H04W 12/12* (2013.01); *H04L 63/145* (2013.01); *H04L 63/1458* (2013.01)

(58) Field of Classification Search
USPC ........ 380/270; 713/201; 707/104.1; 370/338; 709/238
See application file for complete search history.

(56) References Cited

U.S. PATENT DOCUMENTS

| 7,565,690 B2* | 7/2009 | Doherty et al. ................. 726/22 |
| 2004/0068668 A1* | 4/2004 | Lor et al. ...................... 713/201 |
| 2004/0107219 A1* | 6/2004 | Rosenberger .............. 707/104.1 |
| 2006/0072527 A1* | 4/2006 | Beck et al. .................... 370/338 |
| 2006/0072760 A1* | 4/2006 | Gates ........................... 380/270 |
| 2006/0123133 A1* | 6/2006 | Hrastar ........................ 709/238 |

* cited by examiner

*Primary Examiner* — Brandon Hoffman
*Assistant Examiner* — Michael D Anderson
(74) *Attorney, Agent, or Firm* — Haynes and Boone, LLP

(57) ABSTRACT

A low-cost security management system for a wireless network utilizes client software having one component that runs on trusted access points and another that runs on wireless client cards on a client PC and/or laptop that enables an administrator to log in and check the status of network security from any client pc. The software monitors the state of the wireless network and reports on unauthorized connections or hacking attack, denial of service attack and potential threats to the security of the network.

20 Claims, 3 Drawing Sheets

DISTRIBUTED WIRELESS SECURITY SYSTEM

FIELD OF THE INVENTION

This invention relates to wireless networks and, more particularly, to protecting the wireless network against unwanted intrusions and use by unauthorized persons.

BACKGROUND

Wireless-networks include one or more radio sets, sometimes called wireless routers or access points that broadcast a signal called SSID (Service Set Identifier) or ESSID (Extended Service Set Identifier). This broadcast announces to all that a wireless network exists. Unauthorized persons, colloquially called "hackers", then may attempt to use the SSID information intercepted over the air to break into the wireless network and use the facility for their own purposes or to generate harmful traffic that may result in the paralysis of the entire network denying service to authorized users.

While there are forms of encryption that are commonly available including WEP (Wired Equivalent Privacy) and WPA/WPA2 (Wi-Fi Protected Access) that offer a degree of security as far as safeguarding messages from being understood by those not in possession of the encryption key, neither is effective against an unauthorized user gaining access to the network or against a denial of service attack. An intruder will be able to gain access to a network even though the network is protected with authentication if the intruder obtains the login password, pass-phrase or certificate by theft, eavesdropping or electronically (by hacking). Once an intruder obtains access, it will be possible to create attacks on the network. To ensure the security of a wireless network, the IT administrator should be able to easily learn about the existence of unauthorized access attempts by rogue users.

Heretofore the problem of the rogue client has been approached either by providing a central server with specialized probes or a server with specialized client cards that run in parallel with the cards of the regular network. Both approaches impose a high cost requirement. It would be extremely advantageous to increase the coverage of security monitoring by allowing each laptop in the network to serve as a probe into the wireless network.

Hereinafter, for convenience, the term laptop will refer to a wireless mobile device, the term PC will refer to a personal computer having a wireless card installed and the term wireless client may accordingly refer to either of the foregoing. Of course as technological improvements are made, such hardware distinctions may become moot and the terminology used herein is not intended to be limiting.

BRIEF DESCRIPTION OF THE DRAWINGS

The foregoing and other objects and features of the present invention may become more apparent from a reading of the ensuing description together with the drawing, in which.

DETAILED DESCRIPTION

In accordance with one aspect of the present invention, a low-cost security monitoring system for a wireless network utilizes the wireless clients and access points as probes to monitor network security. In the illustrative embodiment the wireless clients scan for new access points and the access points scan for new clients. A wireless client detecting a new access point or wireless client notifies its associated access point which in turn promulgates that information to every other authorized access point in the network. As presently configured, client programs that run on client laptops, purpose-built drivers that run on wireless client cards installed in PCs and firmware that runs on wireless access points allow the interchange of security-related information rules and alarms within the trusted network. The client program running on any client laptop in the trusted network will enable an administrator to classify as trusted or untrusted all clients and access points in its geographic area and thereafter enable the administrator to log-in and check the status of network security from any such client laptop. The access points synchronize security alarms with each other advantageously via IAPP (802.11F). An access point determining that a security policy has been violated sends out an alert allowing an administrator to log in at any wireless laptop and download an event log from the access point serving that laptop in the trusted network.

Figure 1:
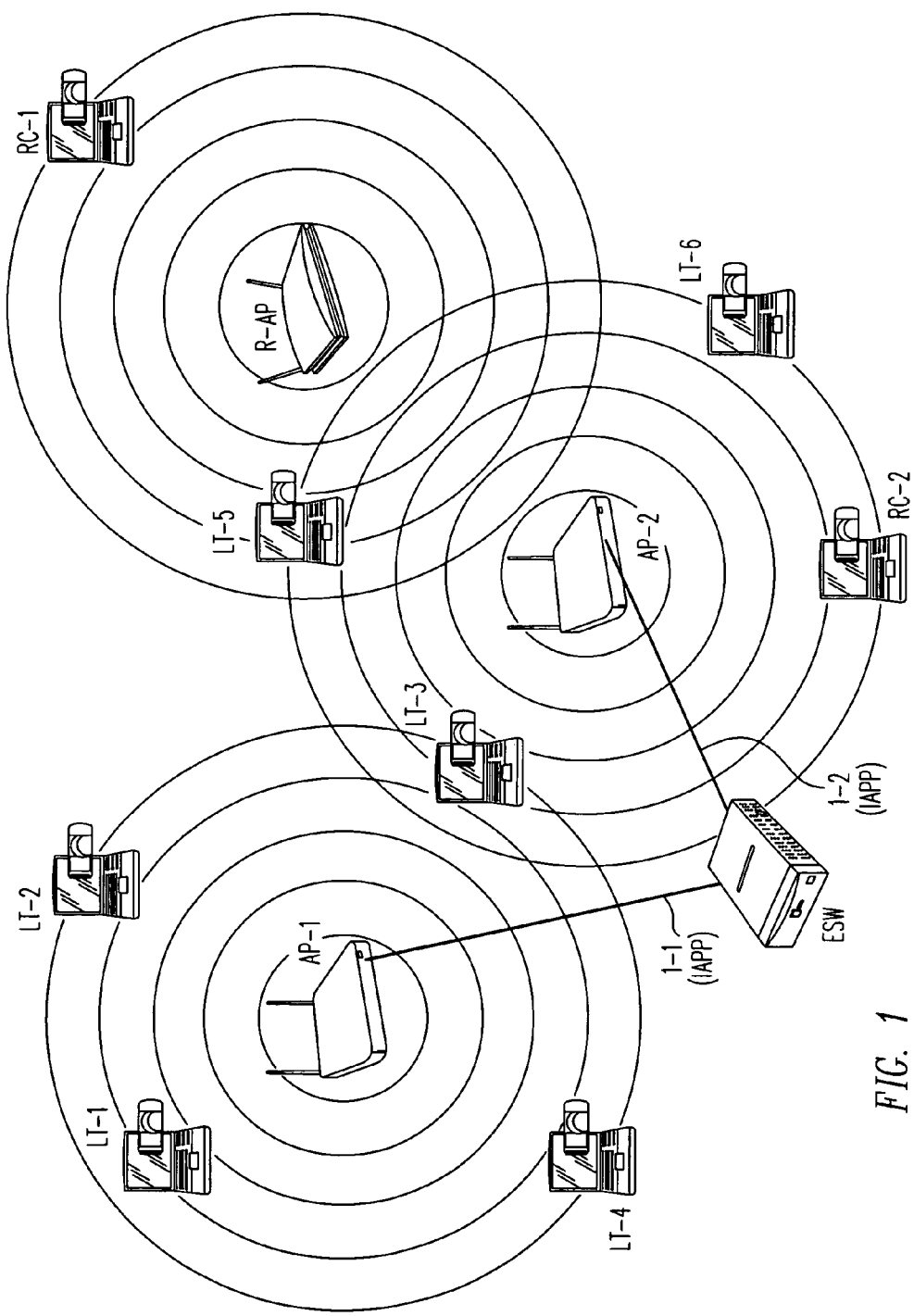
FIG. 1 shows a wireless network in which the distributed security monitoring system of the invention is applied according to one embodiment.

Referring to FIG. 1, a wireless network includes an Ethernet switch ESW and mobile devices having wireless capability such as laptops LT-1 through LT-6. Of these, laptops LT-1 through LT-4 are within the local geographic area served by wireless access point AP-1. Sometimes hereinafter laptops LT-1 through LT-4 will be referred to as "client" laptops of access point AP-1. Laptop LT-3 is also within the geographic area served by wireless access point AP-2 which also serves Laptops LT-5 and LT-6.

Ethernet switch ESW is connected to wireless access point AP-1 by cable 1-1 and to wireless access point AP-2 by cable 1-2. In a large installation, Ethernet switch ESW would be connected by individual connecting cables similar to cables 1-1 and 1-2 to each of the other wireless access points in the trusted network. So far, all of the laptops and access points are considered to be "legitimate", but their authenticity has not yet been validated. Accordingly, the "trusted" network has not yet been defined.

Now let it be assumed that a rogue laptop, i.e., rogue "client" RC-2 lies within the range or in the service area of access point AP-2. Such a rogue client, if undetected, could cause harm to the network. An even greater threat is posed by rogue access point R-AP whose "service area" includes rogue client RC-1. As shown, the range of rogue access point R-AP partially overlaps that of access point AP-2 giving it the possibility of directly affecting trusted client LT-5 and thereby indirectly having the ability to disrupt communication between every laptop in the as network served by access point AP-2 that it is desired to safeguard.

Of course, it would be possible for the user at a laptop such as LT-5 to detect the presence of any access point in its range, including a rogue access point such as R-AP, by manually going through a series of drop-down menus (for example, in the "Windows" operating system: "start", "my network places", "view available network connections"). However, such detection is not automatic and there is no automatic way to inform other users whether the access point can be trusted or not. It is therefore an aspect of the present invention to automatically detect the presence of rogue clients such as RC-1, RC-2 as well as rogue access points such as R-AP and promulgate that information to maintain a "trusted" network having "trusted" clients and access points.

Figure 2:
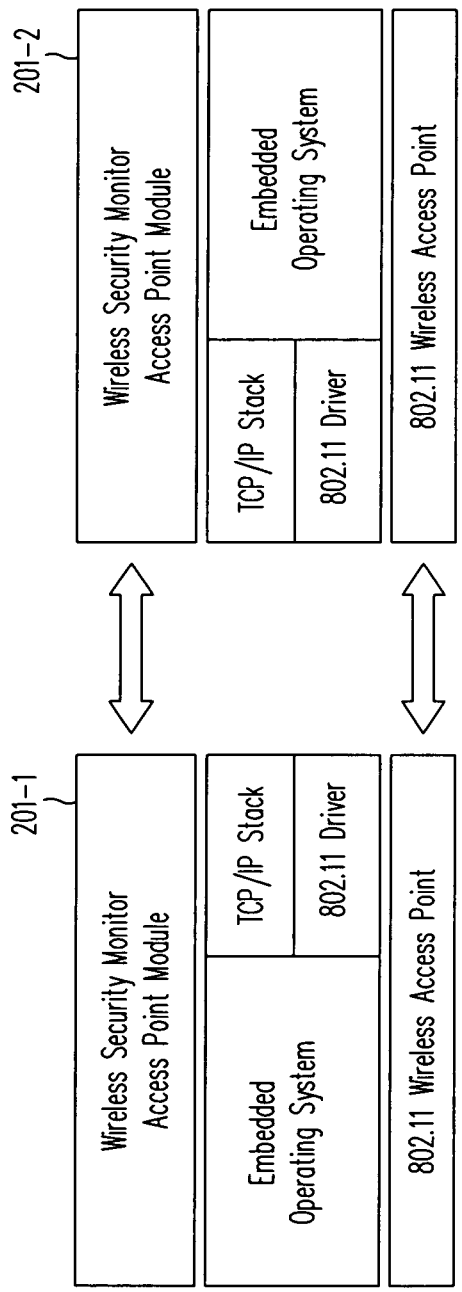
FIG. 2 shows the inter-communication between wireless access points having the security software of the invention installed according to one embodiment.

Referring to FIG. 2, the internal architecture that enables the exchange of information between wireless access points AP-1 and AP-2 of FIG. 1 is shown at 201-1 and 201-2. Information interchange advantageously makes use of the Inter Access Point Protocol Across Distribution Systems (IAPP) described in IEEE Recommended Practice 802.11(F), the entirety of which is hereby incorporated by reference. A copy of the Recommended Practice is available from the IEEE, 445 Hoes Lane, Piscataway, N.J. 08855.

Each of APs 201-1 and 201-2 includes a microprocessor having an embedded operating system such as Windows or Linux that controls the familiar TCP/IP Stack as well as an 802.11 driver. In addition, the microprocessor runs client firmware embodying the wireless security monitoring (WSM) rules of the distributed network monitoring system of the invention as hereinafter to be described. The upper bidirectional arrows refer to the application layer while the lower bidirectional arrows refer to the physical layer of the information interchange protocol. It should be noted that APs may exchange information over a wireless channel or over the cables 1-1 and 1-2 of FIG. 1 via the Ethernet switch ESW. The messages interchanged between APs will be described hereinafter.

Figure 3:
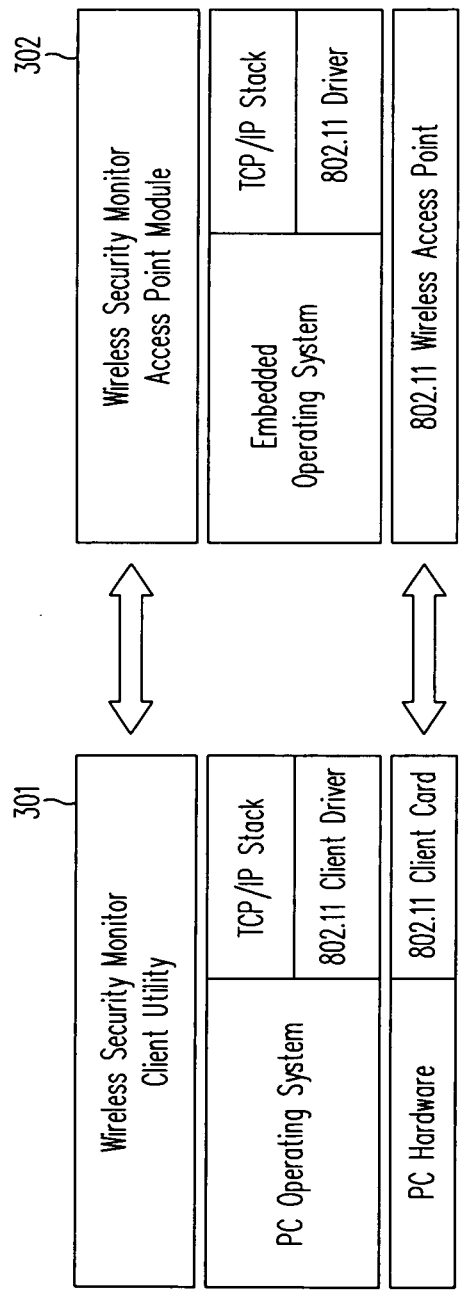
FIG. 3 shows the inter-communication between an illustrative administrative computer and a wireless access point AP-1 having the security software of the invention installed according to one embodiment.

FIG. 3 shows, at the left, the internal architecture responsible for communication between a PC 301, such as any one of wireless clients LT-1 through LT-6 of FIG. 1 and, at the right, a wireless access point 302 such as any one of access points AP-1 or AP-2 of FIG. 1. The PC is assumed to have a conventional operating system such as Windows or Linux running on a microprocessor and performing the usual PC functions including the control of a TCP/IP Stack as well as an 802.11 Driver. In addition, the PC hardware includes an 802.11 client card having the client utility software of the invention installed. The messages exchanged between wireless clients and their serving APs will be described hereinafter.

Setting Up the Distributed Monitoring System

Figures 4A, 4B:
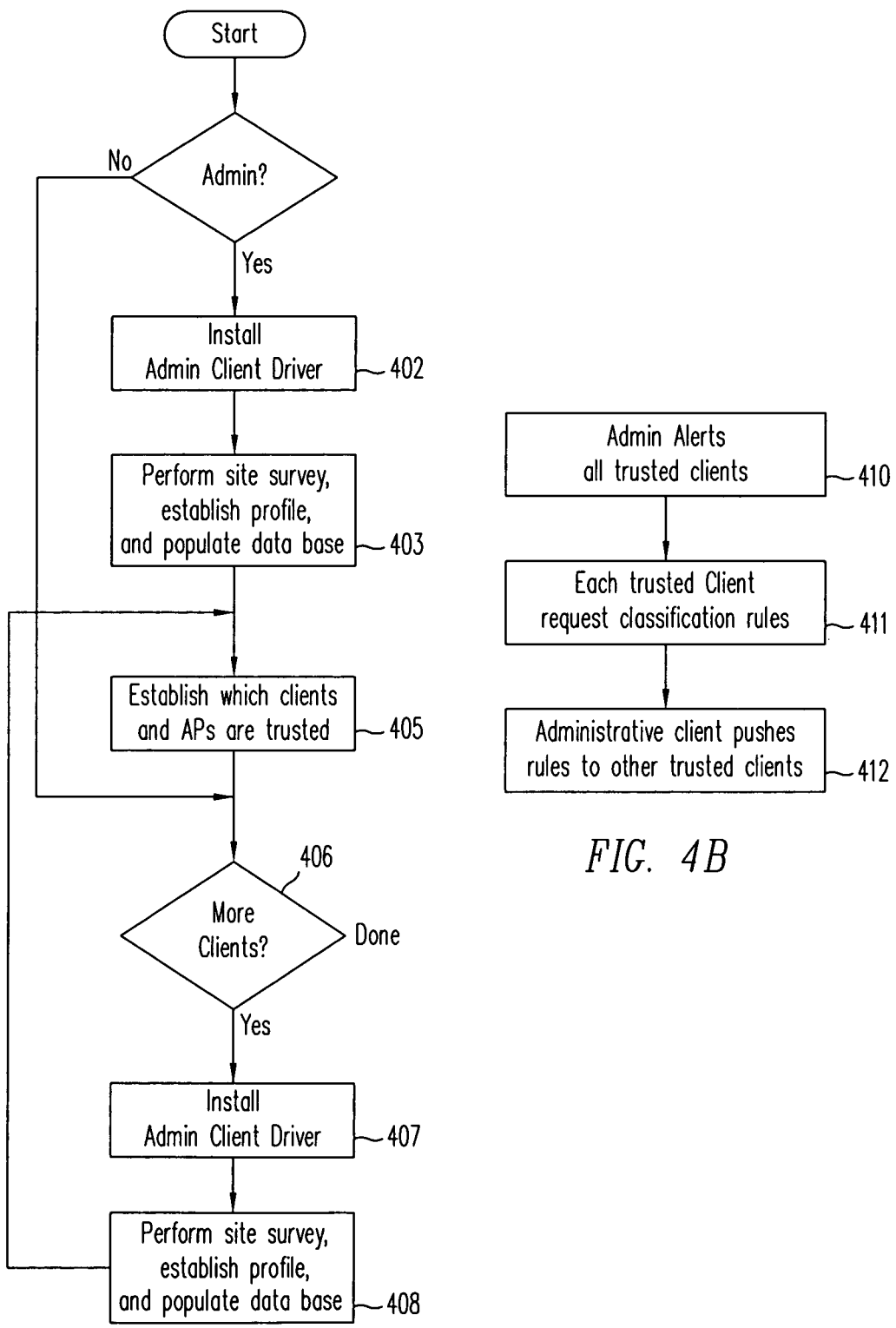
FIG. 4A is a flow chart for setting up the driver for the distributed monitoring system in a client laptop and populating its data base according to one embodiment.
FIG. 4B is a flow chart showing promulgation of security information to the client access points according to one embodiment.

In accordance with one aspect of the invention, referring to FIG. 4A, a client utility program is first installed on any of laptops LT-1 through LT-6 in what will be established to be the "trusted" network. Assume that the program is loaded into laptop LT-1, hereinafter sometimes referred to as the administrative computer. At 'Start', the administrator inserts a CD containing the utility program and the usual "set-up wizard" into the laptop. Alternatively, in a large system, the system administrator could, equally advantageously, insert the CD into a PC as network administrator and log on to the network of laptops, alerting each to download new software. In accordance with one embodiment of the invention, it is to be emphasized that any computer on the network can be so designated.

The utility software for the distributed monitoring system performs one or more of the following functions:

Provides a user interface and mechanism for both initial system set up and regular management.

Sets up the profiles on all access points in the wireless network.

Configures the security policy violation rules and distributes them to all the trusted wireless clients.

Downloads the most recent historical security alarm status from its associated access point.

Provides a pop-up window display for the administrator when new security alarms are either downloaded from an access point or detected by the wireless client on which it is installed.

At step 402, the driver software for the distributed monitoring system is installed. At step 403, the client software automatically conducts an initial "site survey" to detect and collect profile information (authentication, encryption, serving access point) from all wireless clients within range. The collected information is used to populate a data base. Accordingly, the administrator is saved the manual labor of entering all the information by hand. (Later, the administrator may manually edit the data as desired).

Initially, all detected devices are "unclassified". The administrator can then edit the data base at step 405 to establish classification rules that indicate those devices that are "trusted". The classification will label as trusted or not trusted such parameters as device vendor, frequency channel(s) configured, SSID and MAC address. All devices not labeled as "trusted" are automatically classified as "untrusted". In this manner, the component parts of the network are identified and classified. Accordingly, laptops LT-1 through LT-6 and access points AP-1 and AP-2 are now defined as the "trusted network".

After the profile information has been entered into admin laptop LT-1, the installed client software executes steps 406-408. Using the data base that had been populated in step 403, the administrative client contacts the other laptops LT-2 through LT-4 and installs the client driver software in them. Each of these laptops will, in step 408, perform its own site survey and populate a data base with the profile.

The Access Point Firmware performs one or more of the following functions:

Provides security monitoring according to the policy rule settings pushed to it from the client utility.

Reports security alarms through e-mail message according to user settings.

Maintains historical security status in its memory, advantageously used as a circular buffer.

Responds to the request of client utility to provide detailed alarm information.

Communicates with all the other access points in the network to synchronize alarms detected remotely.

Records alarm reports from trusted wireless clients. Messages implementing each of the above functions will now be described.

Distributing Policy Classification Rules to Wireless Clients

In accordance with one embodiment of the invention, access points AP-1 and AP-2 contain firmware that contains the protocols to permit the interchange of information with each other and with the wireless clients LT-1, etc., in the trusted network. In addition, the access points contain the policy violation rules and alarms (to be defined hereinafter). These rules will enable the access points to evaluate information forwarded by the wireless clients. Policy violation rules are configured by selecting the policy violation rules from a list.

Since all AP and client card devices in the trusted network perform security monitoring jointly, the policy violation rules and classification database are "pushed" to all devices. Advantageously, to conserve memory on access points, they may be required to receive and keep only the policy rules database.

Communications Protocols Between APs and Clients

Certain of the messages transmitted employ the TCP protocol. The TCP protocol enables two hosts to establish a connection and exchange streams of data. TCP guarantees delivery of data and also guarantees that packets will be delivered in the same order in which they were sent. Others of the messages employ the https protocol (sometimes referred to as SSL) which encrypts transmitted data. An illustrative communications protocol in effect between an AP and its wireless clients operates as follows:

- A condition justifying an alert is detected by a wireless client.
- The wireless client informs its associated AP by posting an alert via https protocol.
- The AP shares the alert with other APs via Ethernet switch ESW using IAPP protocol.
- The other APs inform their wireless clients via TCP protocol.
- The clients retrieve the alert log from their respective AP via https protocol.
- The AP informs the wireless client of alert by TCP protocol;
- The wireless client retrieves the alert log from AP via https protocol.

Synchronization

So that other clients may receive the same classification rules as were installed in LT-1 in step 405 of FIG. 4A, the steps of FIG. 4B are executed by the admin client software. At step 410, access point AP-1 transmits an alert to each of its trusted wireless clients by multicast message. At step 411, each client receiving the alert sends a TCP message requesting the access point to transmit the classification rules. At step 412, the admin client software sends a TCP message that "pushes" the rules to the trusted clients that have requested them.

Policy Violation Rules Defined—Intrusion Alarms

Rogue client Detected alarm is raised when a client is detected doing illegal things (e.g., trying unauthorized connection). A rogue client can be a new client detected or an existing client. This alarm is likely to go off with another alarm which defines an illegal behavior of WLAN client.

AP SSID Changed alarm is raised when the SSID value is changed on an access point. If the SSID change is not carried out by a WLAN administrator, it might indicate that an attacker is using MAC address spoofing to masquerade as a legitimate access point.

AP Channel Changed alarm is raised when the channel number gets changed on an access point. If the channel change is either carried out by a WLAN administrator or by the AP itself (auto channel selection), it is normal. Otherwise, it might indicate that an attacker is using MAC address spoofing to masquerade as a legitimate access point.

Spoofed MAC Address alarm is raised when the MAC address of an AP or client has been spoofed. MAC address spoofing can lead to various security attacks. If MAC based authentication is employed, a spoofing attack can easily crack the system.

Client Sending Spurious Traffic alarm is raised when a client is sending traffic without getting connected to an access point indicating that it is likely a rogue client.

ADHOC SSID SAME AS AP ALARM is raised when a client is running adhoc mode using the same SSID as our access point. Malicious users could use the same SSID as an AP, fooling the client that the connection is made with a legitimate AP.

Policy Violation Rules Defined—Denial of Service Alarms

Duration Attack alarm is raised when a client is sending packets with abnormally large durations. The duration field in an 802.11 packet tells the other stations on the network how long they must wait before transmitting again. If one station uses values which are too large, this is a denial of service because it prevents other stations from sending packets.

Disassociation Attack alarm is raised when an excessive number of disassociation frames are received from a client. This usually means a rogue client is operating. If it spoofs a client's MAC address, the client connection will be dropped by the associated access point.

Deauthentication Attack alarm is raised when an excessive number of deauthentication frames are received from a client. This usually means a rogue client is operating. If it spoofs a client's MAC address, the client connection will be dropped by the associated access point.

Association Table Full alarm is raised when an access point has refused a new client association request due to lack of memory. This alert could be caused by an AP under extremely heavy load from legitimate clients, or it could be evidence that a denial of service attack is underway. Some forms of denial of service attack will create many fake associations so that legitimate clients can no longer use the AP.

Authentication Failure Attack alarm is raised when an excessive number of authentication failure frames (with a reason code of previous authentication failed) are sent to a client. This type attack usually spoofs the MAC address of AP so that legitimate clients can no longer associate with that AP.

EAPOL-LOGOFF Attack alarm is raised when an excessive number of 802.1x EAPOL-LOGOFF frames are received from a client. It fools the AP to log off the client. This type attack usually spoofs the MAC address of clients so that legitimate clients can no longer associate with that AP.

Policy Violation Rules Defined—Vulnerability Alarms

AP Is Not Using Encryption alarm is raised when access point does not have data encryption enabled. If AP is not using encryption then sniffers can be employed to capture and disassemble the packets to get the full data.

AP Broadcasting SSID alarm is raised when access point is broadcasting its SSID. This enables rogue client to know the SSID in use.

Default SSID in Use alarm is raised when access point is using the default SSID. This indicates that an unconfigured access point is available and would allow hackers to connect to the AP using the default SSID.

Duplicate SSID in Use alarm is raised when an access point does not belong to Trusted Network (i.e., in a look-up table stored on the AP) or is using the same SSID as APs in Trusted Network.

New access point Detected alarm is raised when an unknown access point is detected for the first time. The administrator needs to classify this client and update the classification database.

Ad-hoc Network Operating alarm is raised when a client is advertising a peer-to-peer network. Ad-hoc networks are not secure ones.

New client Detected alarm is raised when an unknown client is detected for the first time. The administrator needs to classify this access point and update the classification database.

HTTP Enabled alarm is raised when web access is enabled in this access point.

Telnet Enabled alarm is raised when telnet service is enabled in this access point.

EAP Disabled alarm is raised when EAP authentication is disabled in this access point.

Policy Violation Rules Defined—Other Alarms

Illegal Channel Usage alarm is raised when an access point configured as belonging to Home Network is configured to use a channel that is not permitted in this country.

Access point Silent alarm is raised when an access point configured as belonging to Home Network has not transmitted any frames for a period of time.

Low Speed Connection alarm is raised when a connection between two devices configured as belonging to Home Network is transferring data packets at a slow rate. A slow rate indicates poor signal reception due to interference or the client being too far from the access point.

The above described functions and steps can be performed through a wireless card, client, or access point with conventional hardware, such as one or more processors and one or more memory. The memory is configured so that the processor(s) can execute the instructions stored in the memory. For example, a client may have an antenna, a wireless transceiver having baseband and RF circuitry, interface circuitry, a processor, and a memory. An access point may have an antenna, a wireless LAN transmission/reception unit, a packet processing unit, a memory, and a network transmission/reception unit.

What has been described is deemed to be illustrative of the principles of the invention. Thus, while an illustrative embodiment has described in which the policy violation rules are stored on the AP user interface allowing the administrator to choose which of the policy violations are to be activated to send an alert, in general both the policy violation rules and classification can be configured on the client side and pushed to other clients as well as access points. In addition, while in the described embodiment wireless access points are programmed to scan for wireless clients and wireless clients are programmed to scan for new access points, it will be apparent that either or both of these functions can be programmed to be performed on either device as may be appropriate or desired. Further and other modifications may be apparent to those skilled in the art and may be made without, however, departing from the spirit and scope of the invention.

What is claimed is:

1. A wireless client card for use with a wireless client in a network for maintaining wireless network security, the card comprising:
    a processor; and;
    a computer readable memory, wherein the memory stores instructions which, when executed, cause the processor to perform the operations of:
        setting up a data base on the wireless client containing profile information from all clients within range of said wireless client;
        sharing files and messages with a network access point according to an agreed protocol, wherein a portion of said files includes policies and rules for implementing wireless intrusion detection;
        transmitting said files to said access point;
        monitoring said network to detect intrusion, wherein the monitoring is performed by the wireless client, and wherein the monitoring includes sensing a presence of an unknown entity and classifying the entity as one of: a trusted entity or a rogue entity based on the policies and rules for implementing wireless intrusion detection;
        notifying said access point upon detecting an intrusion;
        receiving, from the access point, a detection of an intrusion by the access point or by all other wireless clients in the network; and
        updating said data base in response to messages exchanged with said access point.

2. The wireless client card according to claim 1 wherein one or more additional access points are located within the network and said card detects the additional access points within range of the network.

3. The wireless client card according to claim 2 wherein said card collects profile information from each detected access point.

4. The wireless client card according to claim 3 wherein said card detects a condition justifying an alert and sends an alert to an access point via https protocol.

5. The wireless client card according to claim 4 wherein said card retrieves an alert log from an access point via https protocol.

6. A wireless access point for maintaining wireless network security, comprising:
    means for receiving from a wireless client policies and rules for implementing wireless intrusion detection, wherein the wireless client policies and rules are stored in a data base of the wireless client, and wherein the data base of the wireless client contains profile information from all access points within range of the wireless client;
    means for exchanging said policies and rules over a secure link with other access points;
    means for receiving a detection of an intrusion from all wireless clients in a network, wherein the detection of the intrusion is carried out by at least one of the wireless clients, and wherein the detection of the intrusion includes sensing a presence of an unknown entity and classifying the entity one of: a trusted entity or a rogue entity based on the wireless policies and rules for implementing wireless intrusion detection;
    means for detecting an intrusion within the network; and
    means for notifying all wireless clients within range when an intrusion has been detected, wherein all the wireless clients are updated with the intrusion detection.

7. The wireless access point according to claim 6 further comprising means for monitoring said network according to the policy rules received from the wireless client.

8. The wireless access point according to claim 7 further comprising a memory for maintaining security alarm information.

9. The wireless access point according to claim 8 further comprising means for responding to a request from the wireless client to provide detailed alarm information.

10. The wireless access point according to claim 6 further comprising means for sharing an alert with other access points using IAPP protocol.

11. A wireless client programmed to administer network security, the client comprising:
    a process or; and
    a computer readable memory, wherein the memory stores instructions which, when executed, cause the processor to perform the operations of:
        setting up an internal data base on the wireless client containing profile information from all access points within range of said wireless client;
        configuring security policy violation rules;
        obtaining from an access point a message indicating a violation of said security policy violation rules;
        detecting an intrusion within a network, wherein the detecting includes sensing a presence of an unknown entity and classifying the entity as one of: a trusted entity or a rogue entity based on the security policy violation rules;
        notifying the access point of the intrusion; and updating said data base in response to said message.

12. The wireless client according to claim 11, wherein the client is programmed to scan for access points and to send a message to an associated access point when a new access point is detected.

13. A wireless access point comprising:
a processor; and
a computer readable memory configured to store instructions for executing, by the processor, a method of administering a wireless network, the instructions comprising:
setting up on a wireless client a data base containing profile information of all other wireless clients and access points within range of the network;
determining which of said clients and access points are trusted;
detecting an intrusion in the network, wherein the detecting includes sensing a presence of an unknown entity and classifying the entity as one of: a trusted entity or a rogue entity based on a set of policies and rules for implementing wireless intrusion detection;
receiving a notification of an intrusion in the network from said clients; and
communicating with at least one trusted one of said access points at least a portion of said data base, wherein the data base is updated with intrusion information.

14. A wireless access point comprising:
a processor; and
a computer readable memory configured to store instructions for executing, by the processor, a method of administering a wireless network, the instructions comprising:
executing a method of administering a wireless network;
setting up a data base on a wireless client containing profile information from all other clients within communication range of said wireless client;
storing in the data base security violation rules and communications protocols from the wireless client, said data base identifying trusted ones of said wireless clients;
scanning all wireless clients within communication range;
creating a log when a wireless client not listed in said data base is detected;
detecting an intrusion within the network, wherein the detecting includes sensing a presence of an unknown entity and classifying the entity as one of: a trusted entity or a rogue entity based on the security violation rules; and
notifying all wireless clients within communication range when an intrusion has been detected, wherein all the wireless clients within communication range are updated with information about the intrusion.

15. The wireless access point according to claim 14 wherein said wireless access point notifies trusted ones of said wireless clients of the existence of said created log.

16. The wireless access point according to claim 14 wherein said wireless access point is programmed to communicate said data base to at least one other access point over a secure connection.

17. The wireless access point according to claim 15 wherein said secure connection employs the IAPP protocol.

18. The wireless access point according to claim 15 wherein said wireless access point notifies trusted ones of said wireless clients by first sending an alert to all trusted ones of said wireless clients.

19. The wireless access point according to claim 17 wherein said access point responds to the receipt of a request from an alerted one of said wireless clients to transmit said log to said alerted one of said wireless clients.

20. The wireless access point according to claim 19 wherein the transmission of said log is by https protocol.

* * * * *